US012036159B2

(12) United States Patent
Feliksa

(10) Patent No.: US 12,036,159 B2
(45) **Date of Patent: *Jul. 16, 2024**

(54) PATIENT SUPPORT APPARATUS HAVING REMOVABLE LITTER AND BASE WITH FOOT DECK SECTION

(71) Applicant: Stryker Corporation, Kalamazoo, MI (US)

(72) Inventor: Neil Feliksa, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,090

(22) Filed: Jun. 21, 2022

(65) Prior Publication Data

US 2022/0313516 A1 Oct. 6, 2022

Related U.S. Application Data

(63) Continuation of application No. 16/705,871, filed on Dec. 6, 2019, now Pat. No. 11,395,779.

(60) Provisional application No. 62/776,810, filed on Dec. 7, 2018.

(51) Int. Cl.
*A61G 7/05* (2006.01)
*A61G 7/16* (2006.01)

(52) U.S. Cl.
CPC ............ *A61G 7/0506* (2013.01); *A61G 7/16* (2013.01)

(58) Field of Classification Search
CPC .......... A61G 5/061; A61G 5/04; A61G 5/066; A61G 5/1051; A47C 19/04
USPC ........................................................ 5/53.3
See application file for complete search history.

(56) References Cited

U.S. PATENT DOCUMENTS

| | | | | |
|---|---|---|---|---|
| 5,896,602 | A * | 4/1999 | Marblestone | A61G 7/1086 5/81.1 R |
| 7,350,249 | B2 | 4/2008 | Jacobs et al. | |
| 7,398,571 | B2 | 7/2008 | Souke et al. | |
| 7,913,337 | B1 | 3/2011 | Masson | |
| 9,486,373 | B2 | 11/2016 | Lambarth et al. | |
| 9,510,981 | B2 | 12/2016 | Lambarth et al. | |
| 11,395,779 | B2 * | 7/2022 | Feliksa | A61G 1/04 |
| 2010/0017964 | A1 * | 1/2010 | Kruse | A61G 7/02 5/604 |
| 2011/0138536 | A1 | 6/2011 | Wernqvist et al. | |
| 2016/0120717 | A1 * | 5/2016 | Wurdeman | A61G 7/16 5/618 |

(Continued)

*Primary Examiner* — Adam C Ortiz
(74) *Attorney, Agent, or Firm* — Howard & Howard Attorneys PLLC

(57) ABSTRACT

A patient support apparatus comprises a litter and a base configured to receive and support the litter when the litter is docked to the base in a docked state. A foot end extension is coupled to a foot end of an intermediate frame of the base, with the foot end extension defining an extended position wherein at least a portion of the foot end extension extends outwardly beyond the foot end of the litter in a direction opposite the head end of the intermediate frame when the litter and base are in the docked state. The foot end extension includes a top surface that is axially aligned with a substantially flat configuration of the litter in the extended position. The foot end extension can be fixedly coupled in the extended position or movably coupled to the intermediate frame and movable between the extended position and a non-extended position.

19 Claims, 8 Drawing Sheets

(56) References Cited

U.S. PATENT DOCUMENTS

| | | | |
|---|---|---|---|
| 2018/0028383 | A1 | 2/2018 | Stryker et al. |
| 2018/0177652 | A1 | 6/2018 | Furman et al. |
| 2018/0185212 | A1 | 7/2018 | Lucas et al. |
| 2018/0369036 | A1 | 12/2018 | Furman et al. |
| 2020/0179199 | A1 | 6/2020 | Feliksa |

* cited by examiner

PATIENT SUPPORT APPARATUS HAVING REMOVABLE LITTER AND BASE WITH FOOT DECK SECTION

CROSS-REFERENCE TO RELATED APPLICATIONS

The subject patent application is a Continuation of U.S. patent application Ser. No. 16/705,871, filed on Dec. 6, 2019, which claims priority to and all the benefits of U.S. Provisional Patent Application No. 62/776,810, filed on Dec. 7, 2018, the disclosures of each of which are hereby incorporated by reference in their entirety.

BACKGROUND

Patient transport systems facilitate care of patients in a health care setting. Patient transport systems comprise patient support apparatuses such as, for example, hospital beds, stretchers, cots, wheelchairs, and chairs, to move patients between locations.

In certain instances, the patient support apparatus includes a litter and a base. In particular, the patient support apparatus is configured wherein the litter can be removably coupled to a base. The litter may include several sections, some of which are capable of being articulated with respect to others. For example the sections of the litter can be articulated such that the litter is configured as a mobile chair, in which the patient is placed upon the litter in a seated position for transport. Still further, in other instances, the sections of the litter may be articulated such that the litter is in a substantially flat configuration, such that a patient may lie flat on a patient support surface. In this latter configuration, the substantially flat litter may be coupled to the base, and the coupled litter and the base may be transported together, such as within an ambulance.

In many circumstances, when the litter is placed into the substantially flat configuration and coupled to the base, the patient support surface of the substantially flat litter is not long enough to both support a patient's head and a patient's feet lying on the litter. Accordingly, because it is generally necessary that the patient's head is supported on the patient support surface during transport, the patient's feet may dangle beyond the patient support surface.

A patient support apparatus designed to overcome one or more of the aforementioned challenges is desired.

DETAILED DESCRIPTION OF THE EMBODIMENTS

Figure 1:
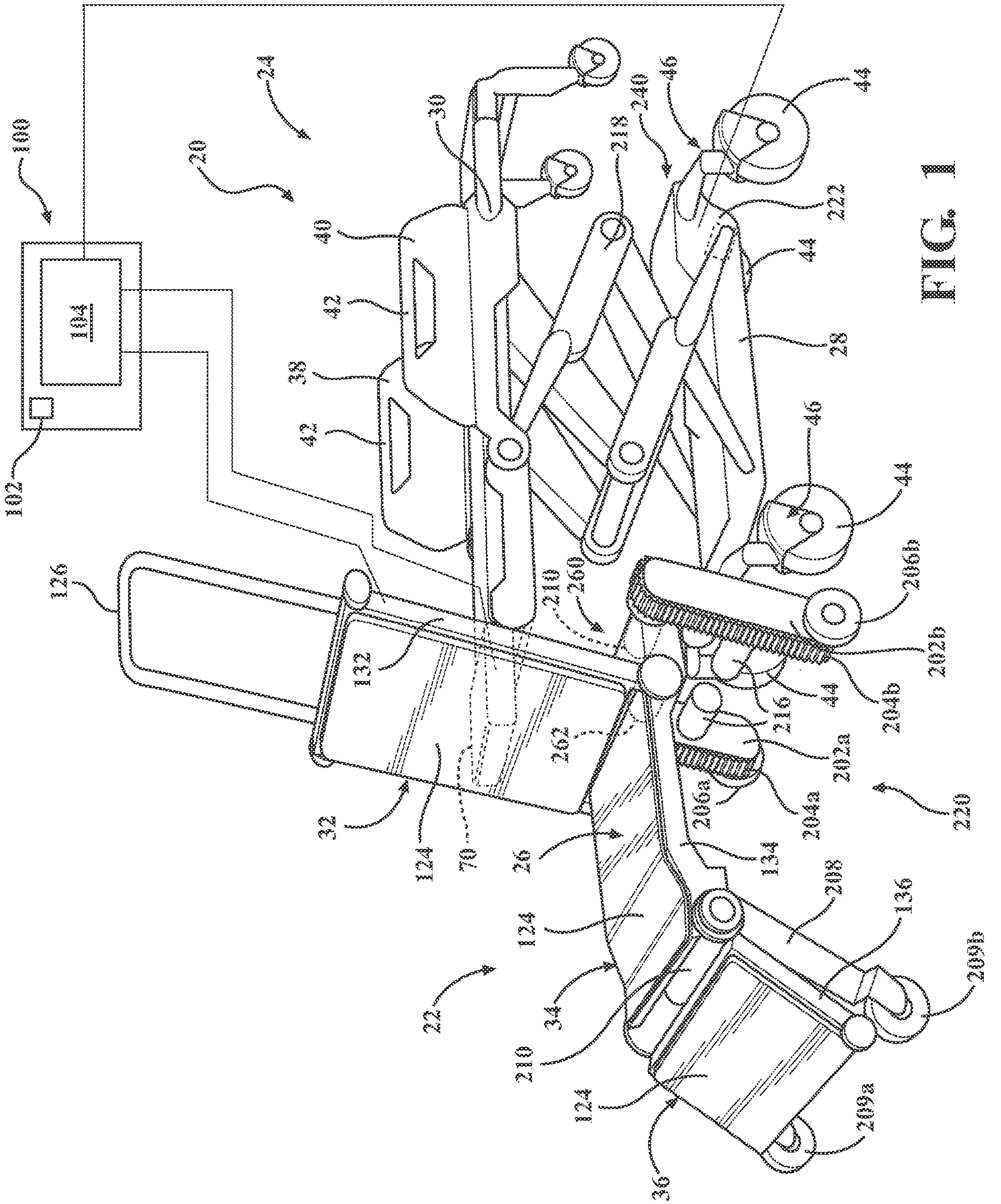
FIG. 1 is a perspective view of a patient support apparatus according to a first embodiment of the present disclosure, shown comprising a base and a litter in an undocked state, with the base including a foot end extension in accordance with one embodiment of the present disclosure.

Referring to FIG. 1, a patient support apparatus of a patient support system is shown at 20 for supporting a patient in a health care setting according to a first embodiment of the present disclosure. As will be appreciated from the subsequent description below, while the illustrated embodiments of the patient support apparatus 20 described herein are configured as cots for transporting patients, the patient support apparatus 20 may comprise a hospital bed, a stretcher, a wheelchair, a chair, or a similar apparatus utilized in the care of a patient. The embodiment of the patient support apparatus 20 shown in FIG. 1 generally comprises a litter 22 and a base 24. The litter 22 defines or otherwise comprises a patient support surface 26 to support a patient.

The base 24 and litter 22 each have a head end and a foot end corresponding to designated placement of the patient's head and feet on the patient support apparatus 20. In FIG. 1, the litter 22 is shown separated from the base 24 in an undocked position; the base 24 is configured to removably receive and support the litter 22 in certain situations. Put differently, in the illustrated embodiment, the litter 22 is configured for releasable attachment to the base 24. As will be appreciated from the subsequent description below, the litter 22 may be considered to be a patient support apparatus 20 both when it is docked, or attached, to the base 24 and when it has been undocked, or removed, from the base 24.

Figure 2:
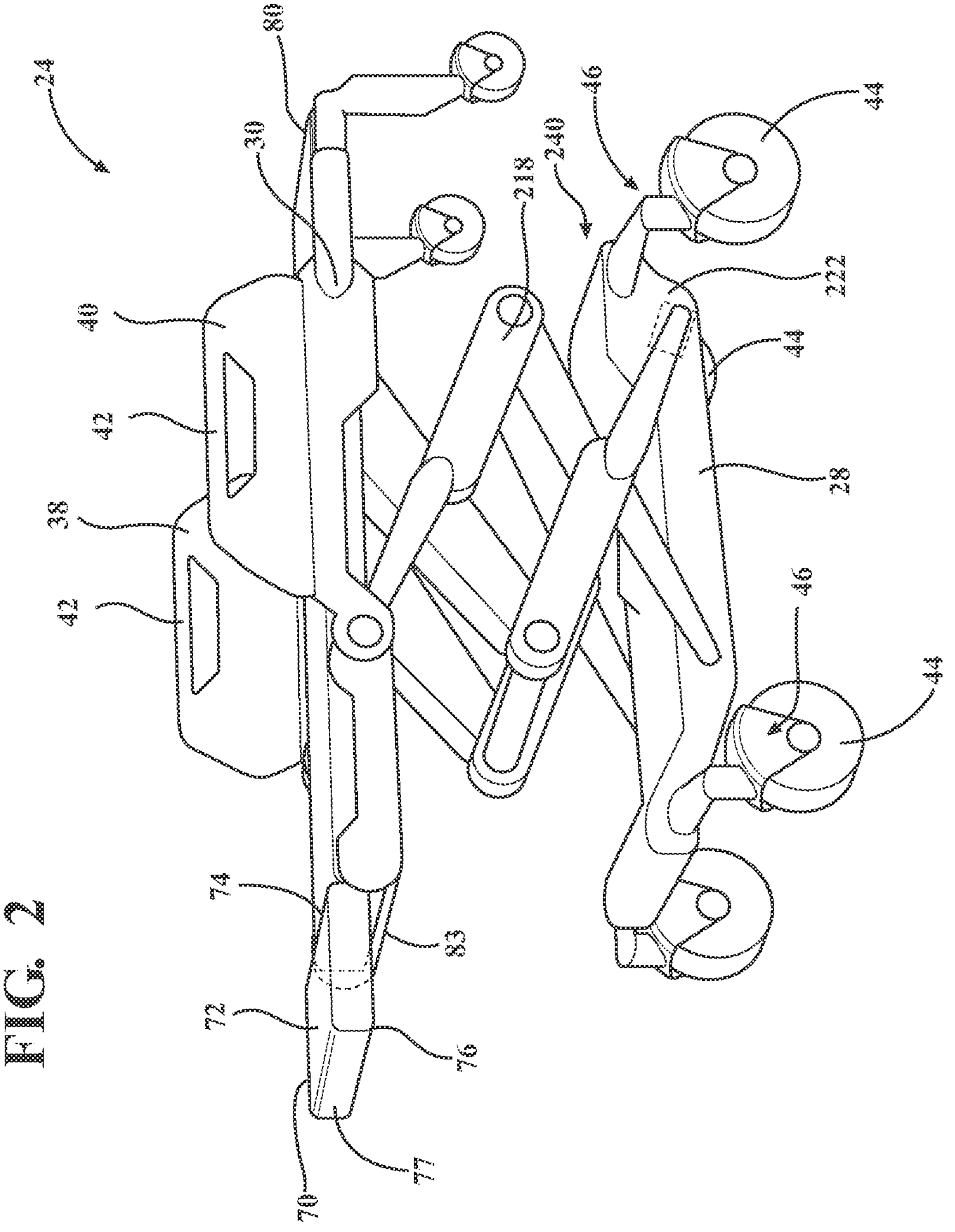
FIG. 2 is a perspective view of the base of FIG. 1.

Referring now to FIGS. 1 and 2, the base 24 comprises a base frame 28 and an intermediate frame 30. The intermediate frame 30 is spaced above the base frame 28 and extends between a head end 80 and a foot end 83. First and second side rails 38, 40 are coupled to the intermediate frame 30. The first side rail 38 is positioned on one side of the base 24, and the second side rail 40 is positioned on the other side of the base 24. In alternative configurations, there may be more than two side rails. The side rails 38, 40 may be movable between a raised position in which they block ingress and egress into and out of the patient support apparatus 20, a lowered position in which they are not an obstacle to such ingress and egress, and/or one or more intermediate positions therebetween. In still other configurations, the patient support apparatus 20 may not include any side rails. In further configurations, the side rails 38, 40 may be coupled to the litter 22 instead of the base 24. Caregiver interfaces 42, such as handles, are shown integrated into the side rails 38, 40 to help facilitate movement of the patient support apparatus 20 over floor surfaces. Additional caregiver interfaces 42 may be integrated into other components of the patient support apparatus 20. The caregiver interfaces 42 are graspable by the caregiver to manipulate the patient support apparatus 20 for movement.

Wheels 44 are coupled to the base frame 28 to facilitate transport over floor surfaces. The wheels 44 are arranged in each of four quadrants of the base 24 adjacent to corners of the base frame 28. In the illustrated embodiments, the wheels 44 are caster wheels, which are able to rotate and swivel relative to the base frame 28 during transport. Each of the wheels 44 forms part of a caster assembly 46. Each caster assembly 46 is mounted to the base frame 28. It should be understood that various configurations of the caster assemblies 46 are contemplated. In addition, in some configurations, the wheels 44 are not caster wheels 46 and may be non-steerable, steerable, non-powered, powered, or combinations thereof. Additional wheels 44 are also contemplated. For example, the patient support apparatus 20 may comprise four non-powered, non-steerable wheels 44, along with one or more powered wheels. In some cases, the patient support apparatus 20 may not include any wheels 44. In other configurations, one or more auxiliary wheels (powered or non-powered), which are movable between stowed positions and deployed positions, may be coupled to the base frame 28. In some cases, when these auxiliary wheels are located between caster assemblies 46 and contact the floor surface in the deployed position, they cause two of the caster assemblies 46 to be lifted off the floor surface thereby shortening a wheel base of the patient support apparatus 20. A fifth wheel may also be arranged substantially in a center of the base. Other configurations are contemplated.

In certain embodiments, a base lift device 240 is coupled to the base frame 28 and is configured to raise and lower the patient between minimum and maximum heights of the base 24, and intermediate positions therebetween, when the litter 22 is supported by the base 24. In the representative embodiment illustrated in FIG. 1, the base 24 comprises one or more lift arms 218 coupling the intermediate frame 30 to the base frame 28. The base lift device 240 comprises one or more base lift actuators 222 coupled to at least one of the base frame 28 and the intermediate frame 30 to raise and lower the intermediate frame 30 and litter 22 relative to the floor surface and the base frame 28. The base lift device 240 and base lift actuators 222 may be coupled to a controller 104 (see FIG. 1) that directs the movement of the base lift device 240 between a raised and a lowered base position. The base lift device 240 may be configured to operate in the same manner or a similar manner as the lift mechanisms shown in U.S. Pat. Nos. 7,398,571, 9,486,373, 9,510,981, and/or U.S. Patent Application Publication No. 2018/0028383, all of which are hereby incorporated herein by reference.

As shown in multiple alternative embodiments illustrated in FIGS. 4A-7D below, a foot end extension 70 is coupled to the foot end 83 of the intermediate frame 30 of the base 24. In each of the embodiments, the foot end extension 70 includes a top surface 72 that is configured to receive and support a foot or feet of a patient when the litter 22 is docked or otherwise received and secured to the base 24. Stated another way, the foot end extension 70 includes a top surface 72 that is configured to support the foot or feet of the patient when the litter 22 is coupled to the base 24 and is in a docked state.

In certain embodiments, the foot end extension 70 is permanently secured or otherwise affixed to the foot end 83 of the intermediate frame 30 in an extended position (see FIGS. 1, 2, and 4A-4D), while in alternative embodiments the foot end extension 70 is coupled to foot end 83, but moveable, with respect to the intermediate frame 30 between the extended position and a second position (see the alternative embodiments including a moveable foot end extension illustrated in FIGS. 5A-5D, 6A-6E, and 7A-7D below).

The extended position, in each of the embodiments as defined herein, refers to a position of the foot end extension 70 wherein at least a portion of the foot end extension 70 extends outwardly from the foot end 83 of the intermediate frame 30 beyond the foot end of the litter 22 in a direction opposite the head end 80 of the intermediate frame 30. In the docked state, as will also be further explained below, the patient support surface 26 of the litter 22 is moved into a substantially flat configuration, and the extended position is thus further defined wherein the top surface 72 is axially aligned with the substantially flat configuration of said patient support surface 26. The extended position may be further described wherein the foot end extension 70 extends beyond the foot end 83 of the substantially flat litter 22 in a direction opposite the head end 80 of the intermediate frame 30 and a head end of the litter 22.

The various alternative embodiments, and the associated methods for docking the litter 22 to the base 24 such that the foot end extension 70 is positioned in the extended position, will be further described below.

Referring back to FIGS. 1 and 3, the litter 22 may comprise several sections, some of which are capable of being articulated relative to others, such as a fowler section 32, a seat section 34, and a foot section 36. The fowler section 32 and the foot section 36 may pivot relative to the seat section 34, or may articulate relative to the seat section 34 in any manner. For instance, the fowler section 32 and/or the foot section 36 may both pivot and translate relative to the seat section 34 in some configurations. Although not illustrated in detail in the drawings, a mattress (or sections thereof) may be disposed on or integral one of more of the sections of the litter 22. In such circumstances, the mattress comprises or otherwise defines a secondary patient support surface upon which the patient is supported.

Figure 3:
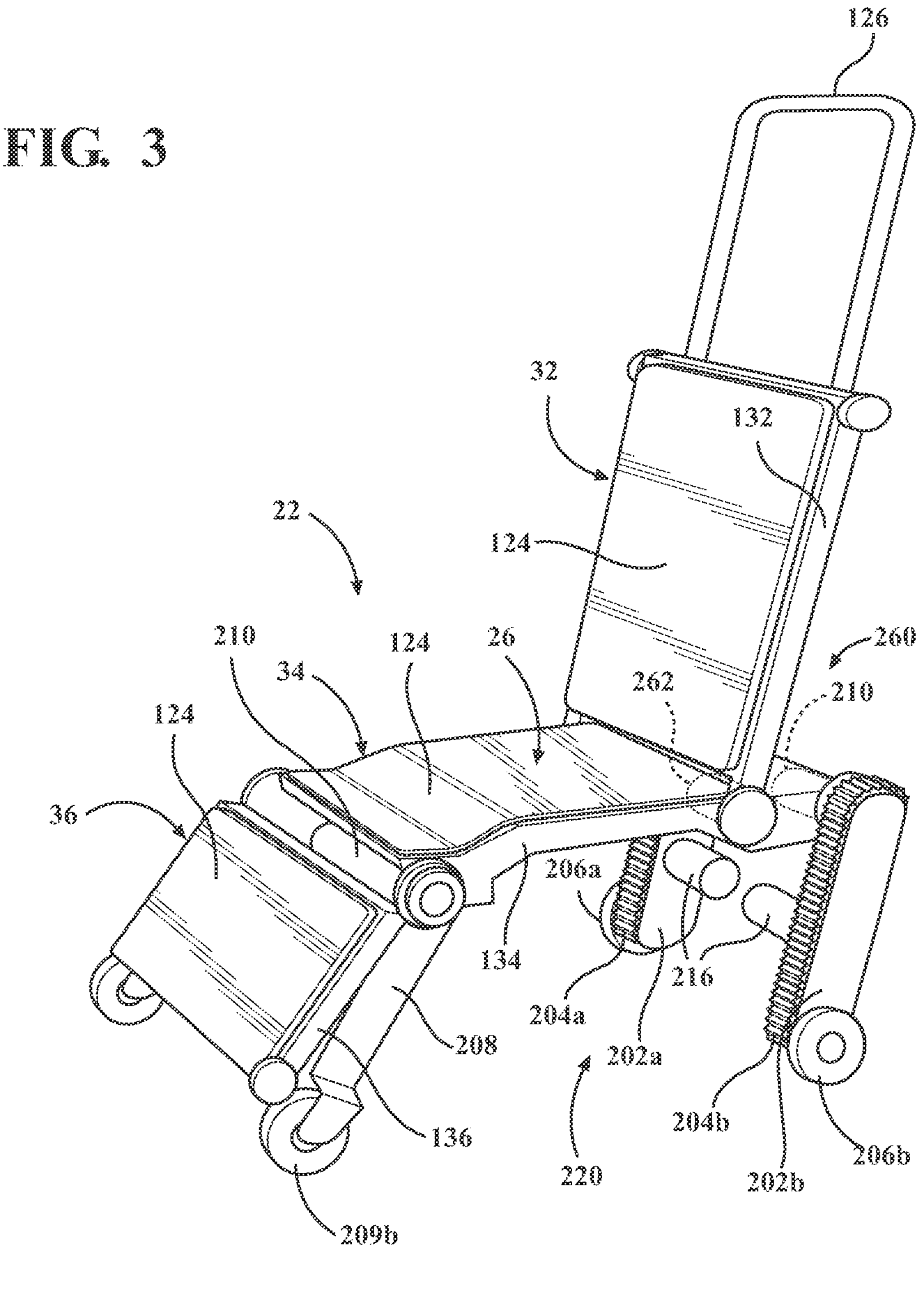
FIG. 3 is a perspective view of the litter in the chair position, corresponding to an upright or seated position.

In the embodiment shown in FIGS. 1 and 3, the litter 22 is configured to also serve as a mobile chair to transport patients up and down stairs, and thus is presented in an upright position. Mobile chairs (sometimes called "stair chairs") are used to evacuate patients from buildings where patient accessibility is limited, such as buildings having more than one floor. Here, the seat section 34 comprises a seat frame 134, and the fowler section 32 comprises a fowler frame 132 that is coupled to the seat frame 134 such that the fowler frame 132 may pivot or otherwise articulate relative to the seat frame 134. The foot section 36 comprises a foot frame 136 coupled to the seat frame 134 such that the foot frame 136 may pivot or otherwise articulate relative to the seat frame 134. In some configurations, the seat, fowler, and foot frames 134, 132, 136 comprise a pair of frame members spaced laterally apart from and fixed relative to each other. In further configurations, the litter 22 comprises actuators driven by the controller 104 (or other separate controller) and coupled to the fowler and foot frames 132, 136 to pivot or otherwise articulate the fowler and foot sections 32, 36 relative to the seat section 34. In the embodiment shown in FIG. 1, deck panels 124 are disposed on each of the frames 132, 134, 136 collectively forming or otherwise defining the patient support surface 26. The deck panels 124 may comprise rigid panels with or without padding or any other suitable materials for supporting the patient.

The litter 22 also comprises a handle 126 coupled to the fowler frame 132. Here, a user (e.g. caregiver) may grasp the handle 126 to manipulate (e.g., lift and/or move) the litter 22. The handle 126 may be fixed or adjustable relative to the fowler frame 132.

As also shown in FIGS. 1 and 3, the patient support apparatus 20 employs the track driving device 220, which is configured to assist users in traversing a flight of stairs by mitigating the load users (e.g., caregivers) would otherwise be required to lift via the handle 126. In some configurations the track driving device 220 may be configured to move the litter 22 across the floor surface F. The track driving device 220 is coupled to the litter 22 and comprises a pair of track frame members 202*a*, 202*b* coupled to the seat frame 134 such that the track frame members 202*a*, 202*b* may pivot or otherwise articulate relative to the seat frame 134. The track driving device 220 comprises continuous tracks 204A, 204B rotatably coupled to a respective one of the track frame members 202*a*, 202*b*. The track driving device 220 further comprises wheels 209A, 209B rotatably coupled to one of the respective track frame members 202*a*, 202*b* and configured to be disposed in contact with the floor surface F. In the illustrated embodiments, the wheels 209A, 209B are freely rotatable. In alternative embodiments, the wheels 209A, 209B may be powered drive wheels coupled to the controller 104 that may be driven by the controller 104.

In addition, the track driving device 220 comprises one or more track actuators 216 coupled to the track frame members 202*a*, 202*b* and coupled to (or otherwise disposed in communication with) the controller 104 (or other controller) to drive the continuous tracks 204A, 204B for ascending and descending stairs. The track driving device 220 may be configured to operate in the same manner or a similar manner as those shown in U.S. Pat. Nos. 9,486,373, 9,510,981, U.S. patent application Ser. No. 15/854,943, and/or U.S. patent application Ser. No. 15/854,199, previously referenced.

In the embodiment of the patient support apparatus 20 depicted in FIGS. 1 and 3, the litter 22 comprises a support frame 208 coupled to the seat frame 134 such that the support frame 208 may pivot or otherwise articulate relative to the seat frame 134 and/or the foot frame 136. In addition, the litter 22 further comprises wheels 209*a*, 209*b* rotatably coupled to the support frame 208 which are configured to be disposed in contact with the floor surface. In the illustrated embodiments, the wheels 209*a*, 209*b* are freely rotatable. In alternative embodiments, the wheels 209*a*, 209*b* may be powered drive wheels coupled to the controller 104 that may be driven by the controller 104.

The litter lift device 200 is coupled to the litter 22 and is configured to raise and lower the patient between minimum and maximum heights of the litter 22, and intermediate positions therebetween, when the litter 22 is separated from the base 24 in an undocked state. To this end, the illustrated litter lift device 200 comprises one or more litter lift actuators 210 coupled to the controller 104 and the litter 22 to raise and lower the patient support surface 26 relative to the floor surface. In the representative embodiment depicted in FIG. 1, two litter lift actuators 210 are coupled to the seat frame 134 and the lift actuators 210 are also respectively coupled to the support frame 208 and the track frame members 202*a*, 202*b*. This arrangement facilitates pivoting the support frame 208 and track frame members 202*a*, 202*b* relative to the seat frame 134. In this manner, the support frame 208 and the track frame members 202*a*, 202*b* act as support legs supporting the seat frame 134 above the floor surface.

As is also shown in FIGS. 1 and 3, a fowler section adjustment device 260 is configured to pivot or otherwise articulate the fowler frame 132 relative to the seat frame 134. To this end, the fowler section adjustment device 260 comprises a fowler actuator 262 coupled to the controller the fowler frame 132, and the seat frame 134 to articulate the fowler frame 132 relative to the seat frame 134.

As noted above, FIGS. 4A-7D illustrate four alternative embodiments of the patient support apparatus 20 including the foot end extension 70 being coupled to the intermediate frame 30, with the litter 22 and the base 24 in an undocked state or unloaded position (FIGS. 4A, 5A, 6A and 7A, respectively), a partially docked state or intermediate position (FIGS. 4B, 5B, 6B and 7B, respectively), and a docked state or loaded position (FIGS. 4C-4D, 5C-5D, 6C-6D and 7C-7D, respectively). It should be noted that in many of the drawings described herein, and in particular FIGS. 4A-7D, certain components of the litter 22 and base 24 of the patient support apparatus 20, and/or other components of the apparatus 20 not included on the litter 22 or base 24, have been omitted from view for convenience of description and ease of illustration.

Figure 4A:
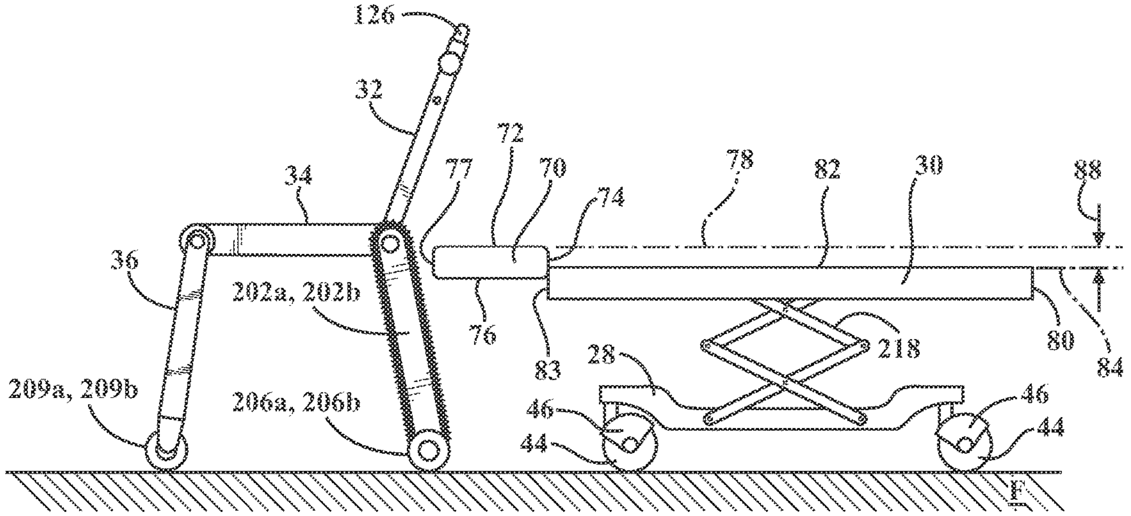
FIG. 4A is a side view of the base and litter of FIGS. 1 and 2 in the undocked state.

Referring first to FIG. 4A, which corresponds to the embodiment also illustrated in FIGS. 1 and 2, the foot end extension 70 for the patient support apparatus 20 is illustrated wherein the foot end extension 70 is fixedly mounted to the intermediate frame 30. In particular, the foot end extension 70 includes a top surface 72 and an opposing bottom surface 76 that extends between an inner end 74 and an outer end 77. The inner end 74 is fixedly coupled to the foot end 83 of the intermediate frame 30.

Further, in certain embodiments and as also shown in FIG. 4A, the fixed coupling of the inner end 74 of the foot end extension 70 to the intermediate frame 30 is such that foot end extension 70 extends from the foot end 83 of the intermediate frame 30 in a direction opposite the head end 80 of the intermediate frame 30. In this position, the top surface 72 of the foot end extension 70, which defines a first horizontal plane 78, is positioned above the upper surface 82 of the intermediate frame 30, which defines a second horizontal plane 84, relative to the floor surface F. The spacing between the first horizontal plane 78 and second horizontal plane 84 defines a gap 88 therebetween. The size of the gap 88 may vary, but is preferably between zero and the thickness of the foot end extension 70, with the thickness defining the distance between the top surface 72 and bottom surface 76.

Figure 4B:
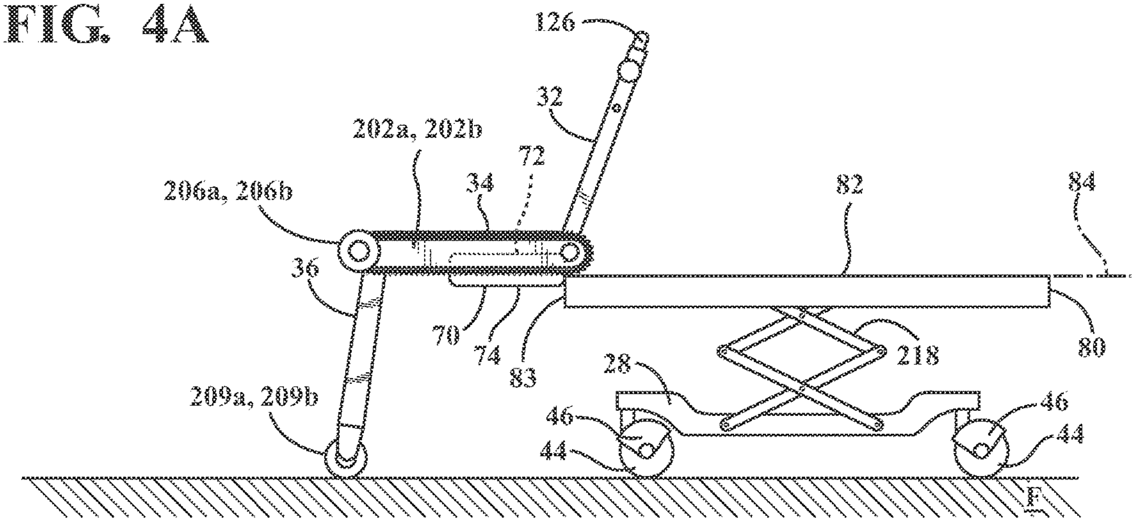
FIG. 4B is a side view of the base and litter of FIG. 4A in a partially docked state.
Figure 4D:
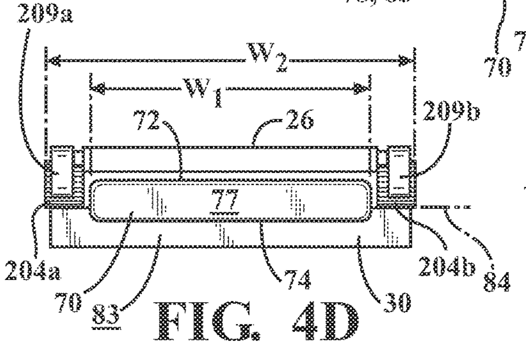
FIG. 4D is an end view of FIG. 4C.
Figure 4C:
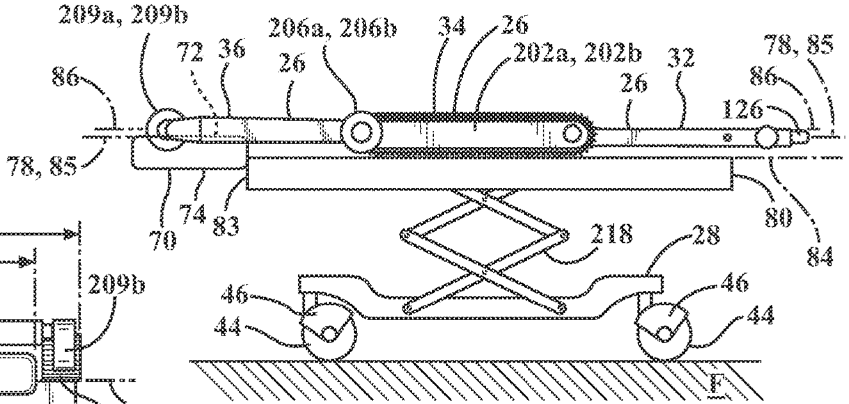
FIG. 4C is a side view of the base and litter of FIGS. 4A and 4B in a docked state.

When the litter 22 is coupled to the base 24 in the docked state, as shown in FIGS. 4C and 4D, the litter 22 is placed into a substantially flat configuration and is disposed adjacent to and above the upper surface 82 of the intermediate frame 30. In particular, in the docked state, the patient support surface 26 is generally planar and defines a third horizontal plane 86 that is parallel to, and spaced from, the second horizontal plane 84 defined by the upper surface 82 of the intermediate frame 30.

Further, in the docked state, the first horizontal plane 78 defined by the top surface 72 is generally coplanar with an axis 85 that extends through deck panels 124 and/or frame elements 132, 134, 136 of the litter 22 that is parallel to, and beneath, the third horizontal plane 86 defined by the patient transport surface 26 of the substantially flat litter 22 (see FIG. 4D). This allows the foot end extension 70 to travel beneath the deck panels 124 and/or frame elements 132, 134, 136 of the litter 22 as the litter 22 is moved between the docked state (see FIG. 4C) and the undocked state (see FIG. 4A) through the partially docked state (see FIG. 4B), as will be explained in further detail below.

As best shown in FIG. 4D, in certain embodiments, the width w1 of the foot end extension 70 is less than the width w2 of the intermediate frame 30. Preferably, as also shown in FIG. 4D, the width w1 of the foot end extension 70 is also less than the distance between the inner surfaces of the respective wheels 209*a* and 209*b*.

In certain further embodiments, the contouring of the inner end 74 preferably corresponds to the adjacent contouring of the foot end 83. Preferably, and as best shown in FIGS. 4A-4C, the inner end 74 provides a flat surface that corresponds generally in shape to the flat surface of the foot end 83 of the intermediate frame 30.

The method for fixedly coupling the inner end 74 of the foot end extension 70 to the foot end 83 of the intermediate frame 30 in the embodiment shown in FIGS. 4A-4D is not limited. In certain embodiments, a fastening device such as one or more nails, screws, bolts, and the like may be used. In further embodiments, an adhesive, glue, a weld (such as one or more spot welds) or some alternative affixing method may be used to fixedly coupling the inner end 74 to the foot end 83. In still further embodiments, a combination of two or more of these methods may be used.

FIGS. 4A-4D, as noted above, illustrate the relationship of the litter 22 and the base 24 in the respective undocked state, the partially docked state, and the docked state and can be used to describe the method for coupling the litter 22 to the base 24 including the foot end extension 70 in accordance with one embodiment.

Referring first to FIG. 4A, when the litter 22 and base 24 are in the undocked state, the litter 22 is spaced apart from the foot end 83 of the intermediate frame 30 and adjacent to the outer end 77 of the foot end extension 70. In this spaced position, the litter 22 may be placed in the upright or seated position, corresponding to the mobile chair position as illustrated in FIG. 3, wherein the patient (not shown) may be seated onto the litter 22 during transport. In this upright or seated position, the seat section 34 is positioned horizontally relative to the floor surface F, while the fowler section 32 is pivoted upwardly to an angle relative to the horizontally positioned seat section 34 to support the patient's back and head. Still further, the foot frame 136 (and corresponding support frame 208) is pivoted downwardly to an angle relative to the horizontally positioned seat section 34 such that the foot section 36 supports the patient's lower legs and feet such that the wheels 209*a*, 209*b* are in contact with the floor surface F. Further, the track frame members 202*a*, 202*b* of the track driving device 220 are pivoted downward such that wheels 209*a*, 209*b* are in contact with the floor surface F. Collectively, the positioning of the support frame 208, foot frame 136, and track frame members 202*a*, 202*b* stabilize the litter 22 and the patient seated on the patient support surface 26 in the upright or seated position. In this upright or seated position, as is evident in FIG. 1, the litter 22 and patient support surface 26 are not in a substantially flat configuration.

When the litter 22 and base 24 are in the partially docked state, as shown in FIG. 4B, the track frame members 202*a*, 202*b* of the track driving device 220 have been pivoted upward such that the length of the track frame members 202*a*, 202*b* and the wheels 209A, 209B are adjacent to the frame element 134 of the seat section 34. Further, the deck panel 124 of the seat section 34 is positioned above the top surface 72 of the foot end extension 70 relative to the floor surface F. In certain embodiments, as also shown in FIG. 4B, a portion of the deck panel 124 of the seat section 34, and the pivot point between the deck panel 124 of the seat section 34 and the deck panel 124 of the fowler section 32, are positioned above the upper surface 82 of the intermediate frame 30. The remainder of the litter 22, aside from the pivoted track frame members 202*a*, 202*b* of the track driving device 220, remain in the upright or seated position, as described above.

When the litter 22 and base 24 are in the docked state, as shown in FIGS. 4C and 4D, the foot end extension 70 extends beyond the end of the substantially flat litter 22, and in particular beyond the end of the wheels 209*a*, 209*b* of the substantially flat litter 22. Moreover, the top surface 72 of the foot end extension 70 in the extended position, defined by the horizontal plane 78, is axially aligned with the axis 85 defined by the substantially flat litter 22. As such, the top surface 72 of the fixed foot end extension 70 provides an extended flat surface that is substantially axially aligned with the horizontal plane 86 defining the patient support surface 26, thereby providing additional surface area for supporting a patient's legs and feet, particularly for taller patients whose feet extend beyond the foot end of the patient support surface 26 that would not be supported without the added foot end extension 70 while supporting the patient's head at the opposite end of the patient transport surface 26.

FIGS. 4A-4D can also be used to describe the method for moving the litter 22 relative to the base 24 from the undocked state through the partially docked state to the docked state.

The method begins wherein the litter 22 and base 24 are in the undocked state, and wherein the litter 22 is moved towards the base 24 towards the partially docked state. During this movement, the track frame members 202*a*, 202*b* of the track driving device 220 begin to pivot upwards until such time when the length of the track frame members 202*a*, 202*b* and the wheels 209A, 209B are adjacent to the frame element 134 of the seat section 34, corresponding to the partially docked state, as shown in FIG. 4B. Further, during this movement, the deck panel 124 of the seat section 34 is slid above the top surface 72 of the foot end extension 70 relative to the floor surface F and towards the head end 80 of the intermediate frame 30. Also, and aside from the pivoting of the track frame members 202*a*, 202*b*, the litter 22 remains in the upright or seated position as described in FIG. 4A above, and thus the seat section 34 remains positioned horizontally relative to the floor surface F, while the fowler section 32 remains pivoted upwardly to an angle relative to the horizontally positioned seat section 34 to support the patient's back and head. Still further, the foot frame 136 (and corresponding support frame 208) remains pivoted downwardly to an angle relative to the horizontally positioned seat section 34 such that the foot section 36 supports the patient's lower legs and feet such that the wheels 209*a*, 209*b* are in contact with the floor surface F.

Once the litter 22 and the base 24 have been moved to the partially docked state, the method may continue wherein the litter 22 continues to move towards the head end 80 of the intermediate frame 30 until such time that the litter 22 and the base 24 are fully coupled and in the docked state, as shown in FIG. 4C. More specifically, the litter 22 is slid along the upper surface 82 of the intermediate frame 30 until such time as the deck panel 124 corresponding to the seat section 34 is approximately centrally positioned above and adjacent to the upper surface 82 the intermediate frame 30, and wherein the deck panel 124 of the fowler section 32 is positioned above and adjacent to the upper surface 82 of the intermediate frame 30 at the head end 80 of the intermediate frame 30. In certain embodiments, a portion of the deck panel 124 of the fowler section 32, and a portion of the handle 126, may extend outwardly beyond the head end 80 of the intermediate frame 30 as the litter 22 is moved from the partially docked state to the docked state (a portion of the deck panel 124 of the fowler section 32 and handle 126 are illustrated as extending beyond the head end 80 of the intermediate frame 30 in FIG. 4C). Further, during the movement towards the fully docked state, at least a portion or all of the deck panel 124 of the foot section 36 of the litter 22 is moved into a position adjacent to the upper surface 82 of the intermediate frame 30 at the foot end 83 of the intermediate frame 30.

Preferably, during the movement of the litter 22 relative to the base 24 from the partially docked state to the docked state, the litter 22 will be repositioned from the upright or chair configuration into a substantially flat configuration, wherein the fowler section 32 pivots downward to a horizontal position corresponding to and extending from the horizontally positioned seat section 34 and wherein the foot frame 136 (and corresponding support frame 208) pivots upward to a horizontal position corresponding to and extending from the horizontally positioned seat section 34 opposite the horizontally positioned fowler section 32. The pivoting of the foot frame 136 (and corresponding support frame 208) is such that the wheels 209*a*, 209*b* are no longer in contact with the floor surface F but are being moved towards a position adjacent to a respective one of the sides 173 of the foot end extension 170. In alternative embodiments, the pivoting of the fowler section 32 of the litter 22 may occur after the litter 22 has been slid along the upper surface 82 of the intermediate frame 30 and the litter 22 and base 24 are in the docked state. Preferably, the foot end extension 70, in the docked state and as shown in FIG. 4C, extends outwardly away from the foot end 83 of the intermediate frame 30 and outwardly beyond the end of the wheels 209*a*, 209*b* relative to the intermediate frame 30.

Figure 5A:
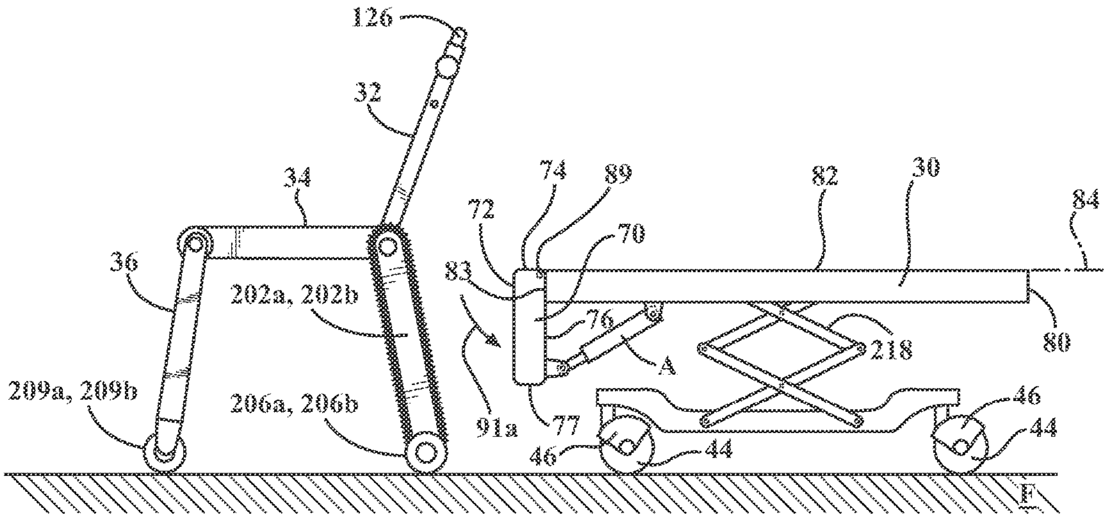
FIG. 5A is a side view of the base and litter in an undocked state, with the base comprising a foot end extension in accordance with an alternative embodiment of the present disclosure.
Figure 5B:
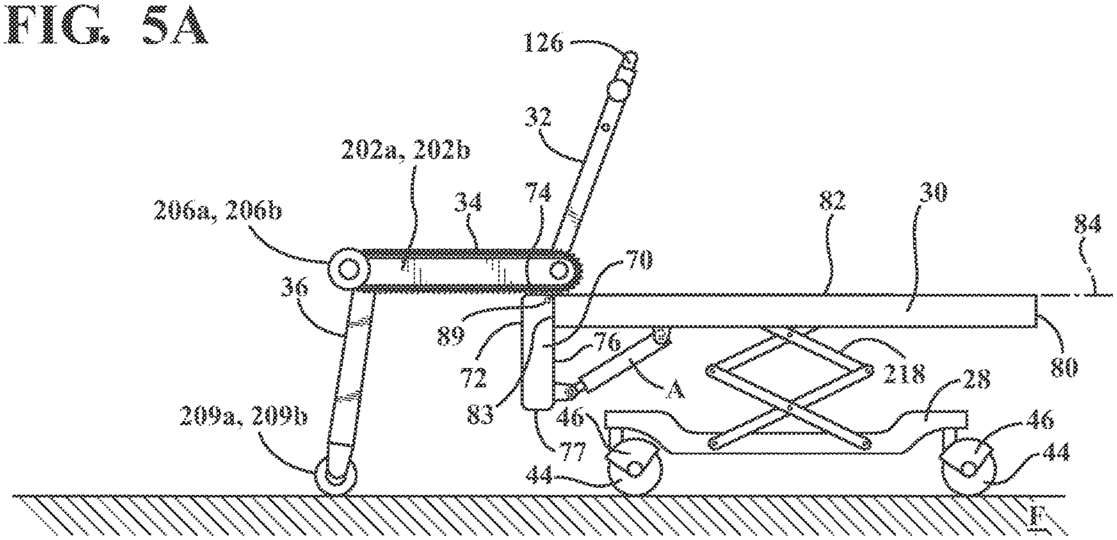
FIG. 5B is a side view of the base and litter of FIG. 5A in a partially docked state.
Figure 5C:
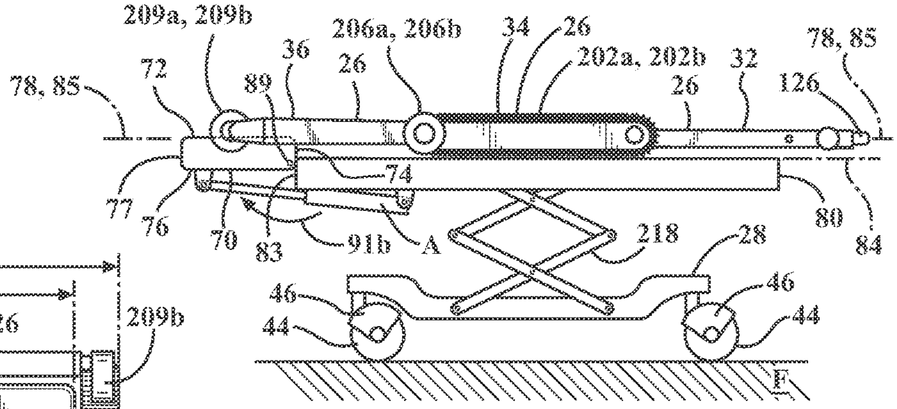
FIG. 5C is a side view of the base and litter of FIGS. 5A and 5B in a docked state.
Figure 5D:
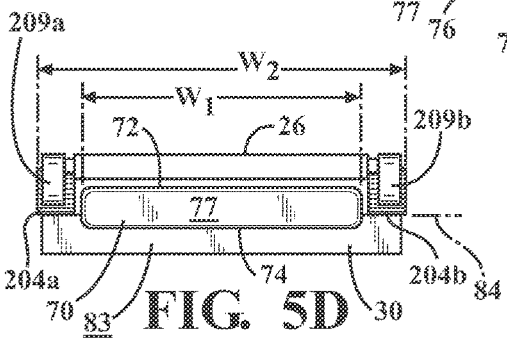
FIG. 5D is an end view of FIG. 5C.

FIGS. 5A-5D, as noted above, describes an alternative configuration of the foot end extension 70 and its coupling to the intermediate frame 30 of the base 24. In the embodiment shown in FIGS. 5A-5D, as opposed to being fixedly mounted to the intermediate frame 30 as in the embodiment illustrated in FIGS. 4A-4D, the foot end extension 70 is instead hingedly coupled to the foot end 83 of the intermediate frame 30 such that it can be positioned in either the extended position (similar to what is shown in FIG. 4A above and as illustrated in FIGS. 5C and 5D) or in a non-extended position (as shown in FIGS. 5A and 5B), and can be pivoted relative to the intermediate frame 30 between the extended position and the non-extended position by the user, with the pivoting movement represented by arrows 91*a* and 91*b*. In the non-extended position, the foot end extension 70 extends generally vertically with respect to the floor surface F and with respect to the upper surface 82 of the intermediate frame 30, with the outer end 77 of the foot end extension 70 below the inner end 74 relative to the floor surface F.

Preferably, when placed into the extended position, the foot end extension 70 is further configured to be reversibly locked such that it remains stationary against any force applied to the top surface 72 in a direction towards the floor surface F, such as by the force of a patient's legs or feet disposed on the top surface 72 in the extended position. Accordingly, the foot end extension 70 cannot be pivoted to the non-extended position from the extended position when the foot end extension 70 has been reversibly locked to the intermediate frame 30 in the extended position.

By way of example, a locking device such as a pin 89 may be inserted through a portion of the foot end extension 70 near the inner end 74 and through a portion of the foot end 83 of the intermediate frame 30 by a user to temporarily lock the foot end extension in the extended position. To move the foot end extension 70 back to the non-extended position, the pin 89 is then removed by the user, thus allowing the foot end extension 70 to be pivoted relative to the intermediate frame 30 as represented by arrow 91*a* in FIG. 5A. The pin 89, for representative purposes only, is positioned generally at the pivot point of the foot end extension 70 relative to the intermediate frame 30 as illustrated in FIGS. 4A-4D, but could be positioned in alternative configurations and is not limited to the arrangement provided herein. Still further, other devices for temporarily locking the foot end extension 70 in the extended position, other than a pin 89, are contemplated.

Referring first to FIG. 5A, when the litter 22 and base 24 are in the undocked state, the litter 22 is positioned apart from the foot end 83 of the intermediate frame 30, and the foot end extension 70 can be placed in the extended position or in the non-extended position.

When the litter 22 and base 24 are in the partially docked state, as shown in FIG. 5B, the foot end extension 70 has been placed in the non-extended position. Further, and similar to FIG. 4B, the track frame members 202*a*, 202*b* of the track driving device 220 have been pivoted upward such that the length of the track frame members 202*a*, 202*b* and the wheels 209A, 209B are adjacent to the frame element 134 of the seat section 34. Also, at least a portion of the deck panel 124 of the seat section 34 is positioned above, or in contact with, the upper surface 82 of the intermediate frame 30 at the foot end 83. In certain embodiments, a portion of the deck panel 124 of the seat section 34 is also disposed adjacent to the inner end 74 of the foot end extension 70. The remainder of the litter 22, aside from the pivoted track frame members 202*a*, 202*b* of the track driving device 220, remain in the upright or seated position, as described above.

When the litter 22 and base 24 are in the docked state, as shown in FIGS. 5C and 5D, the foot end extension 70 has been rotated back to the extended position from the non-extended position relative to the intermediate frame 30 (the movement being represented by arrow 91*b* in FIG. 5C), and as such extends beyond the end of the substantially flat litter 22, and in particular beyond the end of the wheels 209*a*, 209*b* of the substantially flat litter 22. Moreover, the top surface 72 of the foot end extension 70 in the extended position, defined by the horizontal plane 78, is axially aligned with the axis 85 defined by the substantially flat litter 22. As such, the top surface 72 of the fixed foot end extension 70 provides an extended flat surface that is substantially axially aligned with the horizontal plane 86 defining the patient support surface 26 in the same manner as discussed above with respect to FIG. 4C. Preferably, and as noted above, the foot end extension is temporarily locked in the extended position through the insertion of the pin 95 or other temporary locking device.

FIGS. 5A-5D can also be used to describe the method for moving the litter 22 relative to the base 24 from the undocked state through the partially docked state to the docked state.

The method begins wherein the litter 22 and base 24 are in the undocked state, and wherein a user ensures that the foot end extension 70 is positioned in the non-extended position. This can be accomplished wherein the user pivots or otherwise rotates the foot end extension 70 relative to the intermediate frame 30 from the extended position to the non-extended position as shown by arrow 91*a* such that the free outer end 77 of the foot end extension 70 is moved towards the floor surface F. Accordingly, the top surface 72 of the foot end extension 70 is generally vertical the plane 78 defining the top surface 72 is transverse to, or in certain instances generally normal to, the plane 84 defining the upper surface 82 of the intermediate frame 30.

Once the user ensures that the foot end extension 70 is in the non-extended position, the litter 22 is moved towards the base 24 to the partially docked state in the manner described above in FIG. 4A and not repeated herein. Once the litter 22 and the base 24 have been placed in the partially docked state, the method continues wherein the litter 22 continues to move towards the head end 80 of the intermediate frame 30 until such time that the litter 22 and the base 24 are fully coupled and in the docked state, as shown in FIG. 5C, and generally in accordance with the method described above with respect to FIG. 4C and not repeated herein.

Once the litter 22 and base 24 are in the docked state, the foot end extension 70 is pivoted back to the extended position (shown by arrow 91*b*) by the user such that the free outer end 77 moves upward and away from the floor surface F until such time as the top surface 72 of the foot end extension 70 is substantially horizontal. As such, the plane 78 defining the top surface 72 is generally parallel to, and above, the plane 84 defining the upper surface 82 of the intermediate frame 30. Still further, the plane 78 of the top surface 72 is generally coaxial with the axis 85 of the substantially flat litter 22. In this extended position, as shown in FIG. 5C, the foot end extension 70 extends outwardly away from the foot end 83 of the intermediate frame 30 and outwardly beyond the end of the wheels 209*a*, 209*b* of the litter 22 in a direction opposite to the foot end 83 and head end 80 intermediate frame 30. While not shown, it is preferable that the foot end extension 70, after pivoting, is locked in the extended position with the pin 89 or other temporary locking device such that the force of the patient's feet or legs does not cause the foot end extension 70 to pivot downward towards the non-extended position. Note that pivoting of the foot end extension 70 between extended and non-extended positions, and the associated temporary locking of the foot end extension 70 in the extended position, could alternatively be accomplished by an actuator A described further below that is controlled by the user via a user input device coupled to the actuator A through the controller 104, or through a separate controller.

Figure 6A:
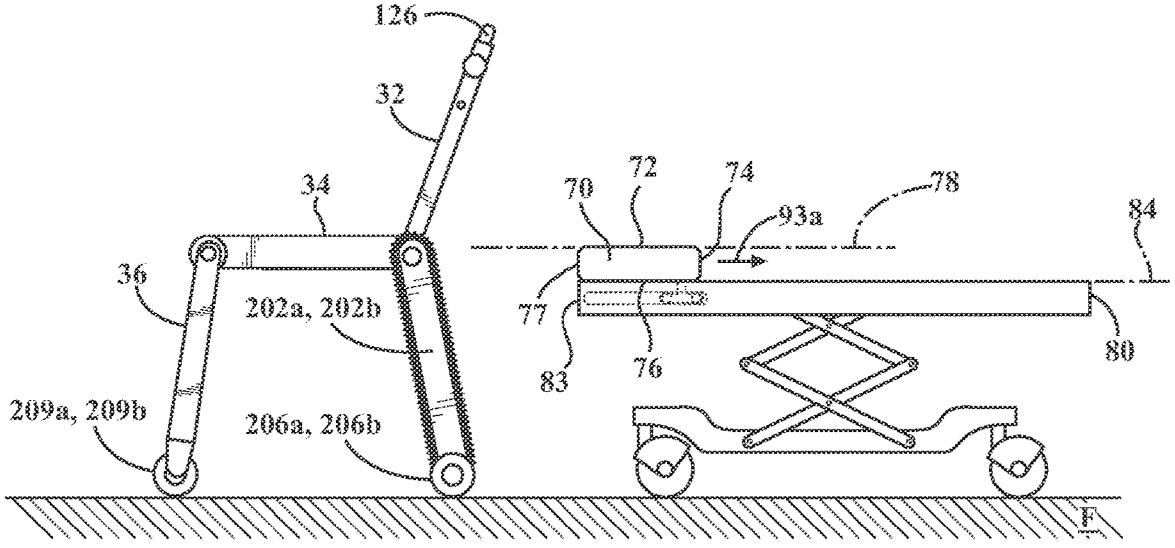
FIG. 6A is a side view of the base and litter in an undocked state, with the base comprising a foot end extension in accordance with yet another alternative embodiment of the present disclosure.
Figure 6B:
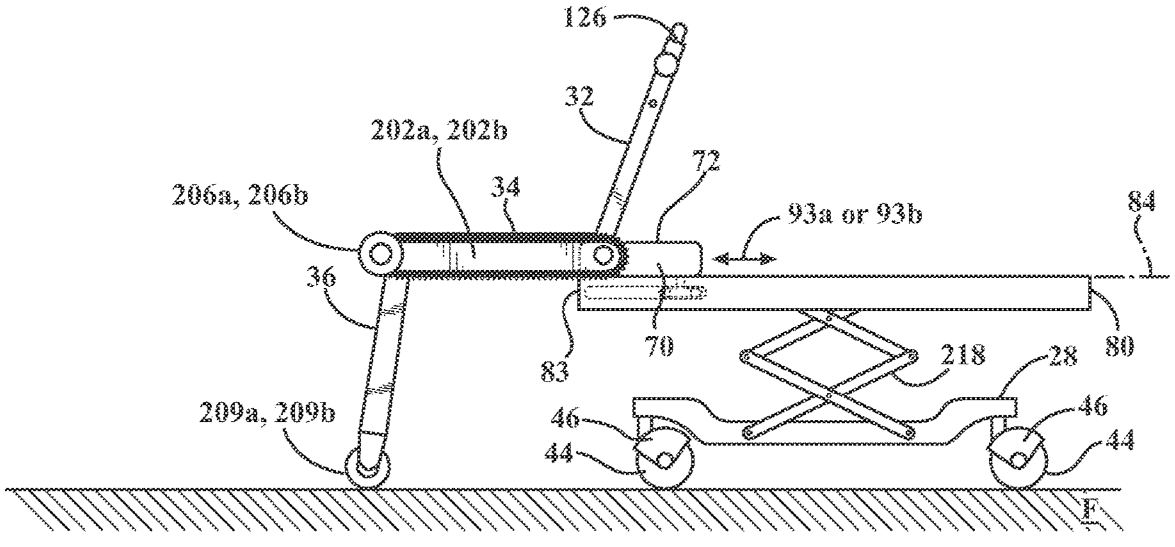
FIG. 6B is a side view of the base and litter of FIG. 6A in a partially docked state.

FIGS. 6A-6E, as noted above, describe additional alternative configurations of the foot end extension 70 and its coupling to the intermediate frame 30 of the base 24. In the embodiments shown in FIGS. 6A-6D or in 6A-6C and 6E, respectively, as opposed to a configuration wherein the foot end extension 70 is hingedly mounted to the intermediate frame 30 as in FIGS. 5A-5D, the foot end extension 70 is instead slidingly coupled within the upper surface 82 of the intermediate frame 30 such that it can be positioned in either the extended position (similar to what is shown in FIG. 5A above and illustrated in FIGS. 6C and 6D/6E) or in a secondary position (as shown in FIGS. 6A and 6B), and can be slidingly moved relative to the intermediate frame 30 between the extended position and the secondary position by the user, with the sliding movement represented by arrows 93*a* and 93*b*. In the secondary position, the foot end extension 70 is positioned inwardly in a direction towards the head end 80 of the intermediate frame 30 relative to the positioning of the foot end extension 70 in the extended position. Accordingly, most, if not all, of the foot end extension 70 is disposed above, and, adjacent to, the upper surface 82 of the intermediate frame 30.

Figure 6C:
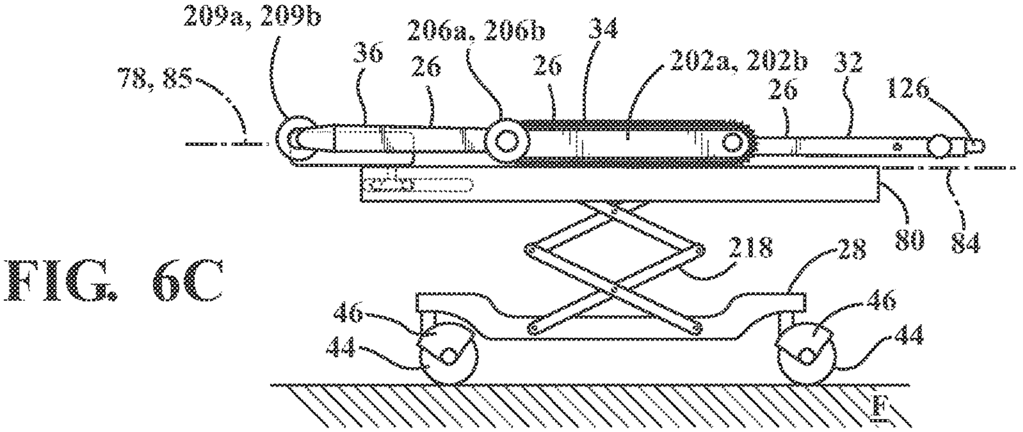
FIG. 6C is a side view of the base and litter of FIGS. 6A and 6B in a docked state.

The method of slidingly coupling the foot end extension 70 to the intermediate frame 30 is not limited. In one exemplary embodiment, as shown in FIGS. 6A-6D, a flange 150 having a vertically extending portion 152 and rollers 154 are coupled to and extend from the bottom surface 76 of the foot end extension 70 that are captured within a channel 140 and slot 142 contained within the intermediate frame 30. In this embodiment, the slot 142 includes a lower surface 144 that defines a plane 146 that is generally parallel to the plane 84, and the rollers 154 roll along the lower surface 144 of the slot 142 as the foot end extension 70 moves between the extended position and the secondary position. In the extended position, as shown in FIG. 6C, the foot end extension 70 is at least partially extended beyond the foot end 83 of the intermediate frame 30, whereas the foot end extension 70 is disposed substantially over the intermediate frame 30 as in FIG. 6A.

In one embodiment, the user may manually apply force to the foot end extension 70 to slide the foot end extension 70 between the extended position and secondary position. In other embodiments, including as also shown in FIGS. 6A-6C, a linear actuator A is coupled to the flange 150 to facilitate movement of the foot end extension 70 between the extended and secondary positions.

The foot end extension 70, in certain embodiments (not shown), may be hingedly coupled to the intermediate frame 30 such that it may be extending beyond the foot end 83 of the intermediate frame 30 also be lowered slightly relative to the intermediate frame 30 towards the floor surface F, when the foot end extension 70 is in the extended position to allow the foot end extension to be more precisely coaxial with the axis of the substantially flat litter 22.

In still another example (not shown), as opposed to including the slot 142 and optional channel 140 in the intermediate frame 30, the reverse is true, wherein the bottom surface 76 of the foot end extension 70 includes the optional channel and the slot and wherein the intermediate frame 30 includes the flange having the optional vertically extending member and horizontal rollers extending upward from the upper surface 82 of the intermediate frame 30 and captured within the respective channel and slot.

An alternative exemplary embodiment of the coupling of the foot end extension 70 to the intermediate frame 30, is illustrated in FIGS. 6A-6C and 6E and is slightly altered from what is provided in FIGS. 6A-6D above. Notably, the channel 140 in the intermediate frame 30 is eliminated, and instead the slot 142 extends to the upper surface 82. Still further, the vertical support member 152 of the flange 150 is shortened, and the rollers 154 are coupled such that the length of the vertical support member 152 generally corresponds to the length of the diameter of the rollers 154. Otherwise, the sliding movement of the rollers 154 within the slot 142 as the foot end extension 70 (manually or through the use of a linear actuator A) moves between the extended position and the secondary position is the same.

Of course, other devices for slidingly coupling the foot end extension 70 to the intermediate frame 30, other than as described in FIGS. 6A-6E, are contemplated.

Referring first to FIG. 6A, when the litter 22 and base 24 are in the undocked state, the litter 22 is positioned apart from the foot end 83 of the intermediate frame 30, and the foot end extension 70 can be in the extended position or in the secondary position (the foot end extension is shown in the secondary position in FIG. 6A).

When the litter 22 and base 24 are in the partially docked state, as shown in FIG. 6B, the foot end extension 70 has been placed in the secondary position. Further, and similar to FIG. 4B, the track frame members 202*a*, 202*b* of the track driving device 220 have been pivoted upward such that the length of the track frame members 202*a*, 202*b* and the wheels 209A, 209B are adjacent to the frame element 134 of the seat section 34. Also, at least a portion of the deck panel 124 of the seat section 34 is positioned above, or in contact with, the upper surface 82 of the intermediate frame 30 at the foot end 83. In certain embodiments, a portion of the deck panel 124 of the seat section 34 is also disposed adjacent to the inner end 74 of the foot end extension 70. The remainder of the litter 22, aside from the pivoted track frame members 202*a*, 202*b* of the track driving device 220, remain in the upright or seated position, as described above.

Figure 6D:
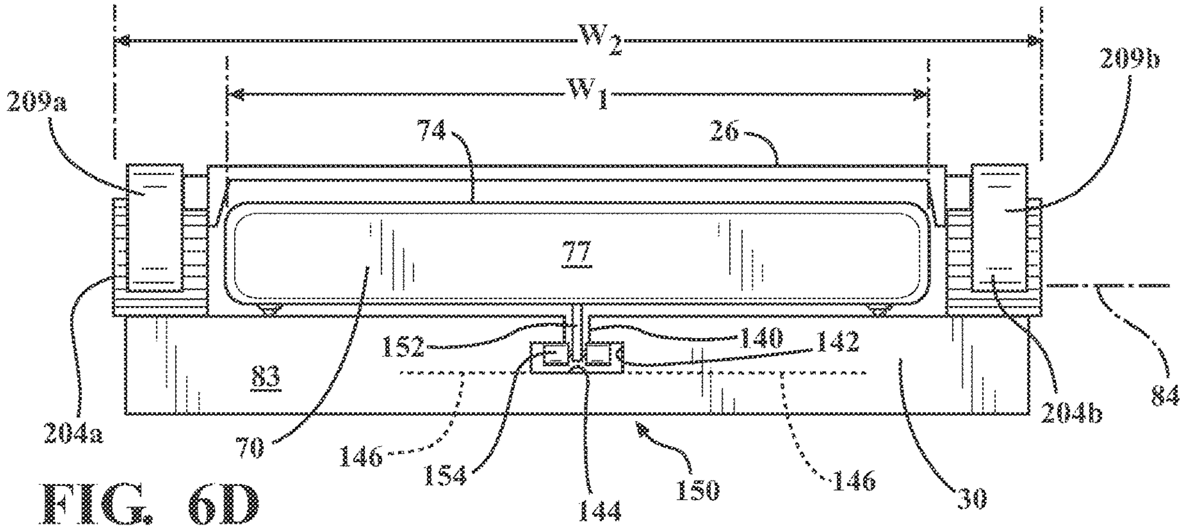
FIG. 6D is an end view of FIG. 6C.
Figure 6E:
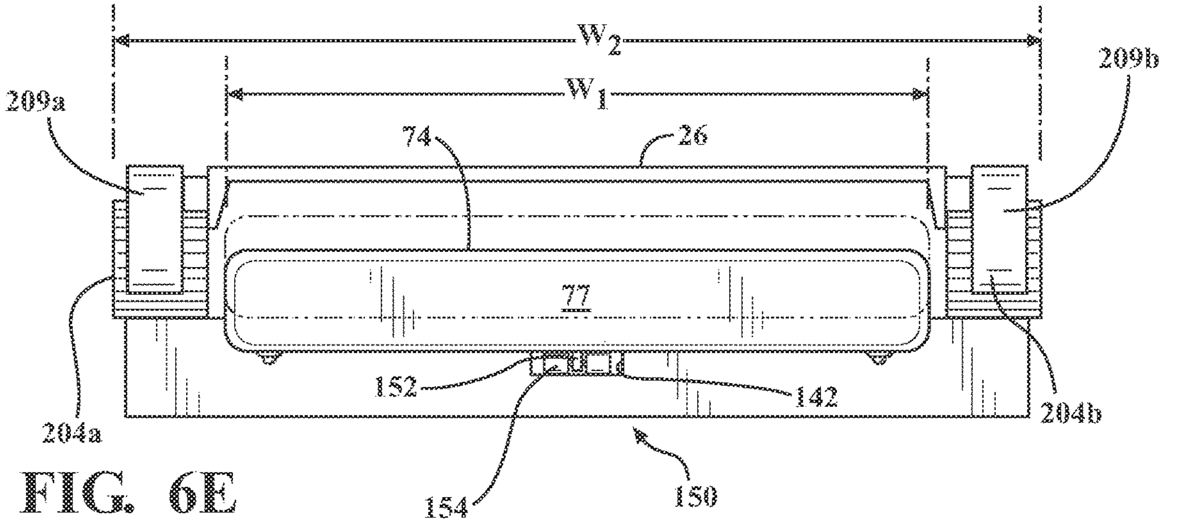
FIG. 6E is an end view of FIG. 6C illustrating the slidable coupling of the foot end extension to the intermediate frame in accordance with another exemplary embodiment.

When the litter 22 and base 24 are in the docked state, as shown in FIGS. 6C and 6D, the foot end extension 70 has been slid back to the extended position from the secondary position, and as such extends beyond the end of the substantially flat litter 22, and in particular beyond the end of the wheels 209*a*, 209*b* of the substantially flat litter 22. Moreover, the top surface 72 of the foot end extension 70 in the extended position, defined by the horizontal plane 78, is axially aligned with the axis 85 defined by the substantially flat litter 22. As such, the top surface 72 of the fixed foot end extension 70 provides an extended flat surface that is substantially axially aligned with the horizontal plane 86 defining the patient support surface 26 in the same manner as discussed above with respect to FIG. 4C.

FIGS. 6A-6D, or alternatively FIGS. 6A-6C and 6E, can also be used to describe the method for moving the litter 22 relative to the base 24 from the undocked state through the partially docked state to the docked state.

The method begins wherein the litter 22 and base 24 are in the undocked state, and wherein a user ensures that the foot end extension 70 is positioned in the secondary position, as shown in FIG. 6A. This can be accomplished wherein the user slides the foot end extension 70 relative to the upper surface 82 of the intermediate frame 30 (either manually or via the linear actuator A, when present) from the extended position to the secondary position as shown by arrow 93*a*. Once the user ensures that the foot end extension 70 is in the secondary position, the litter 22 is moved towards the base 24 and proceeds generally to move the litter 22 relative to the base 24 to the partially docked state, as shown in FIG. 6B, in the manner described above in FIG. 4B and not repeated herein. Once the litter 22 and the base 24 have been moved to the partially docked state, the method continues wherein the litter 22 continues to move towards the head end 80 of the intermediate frame 30 until such time that the litter 22 and the base 24 are fully coupled and in the docked state, as shown in FIG. 6C (and either FIG. 6D or 6E), and generally in accordance with the method described above with respect to FIGS. 4B and 4C and not repeated herein.

Once the litter 22 is in the docked state relative to the base 24, the foot end extension 70 is slid back to the extended position (shown by arrow 93*b*) (either manually or via the linear actuator A, when present). In this extended position, as shown in FIG. 6C, the foot end extension 70 extends at least partially outwardly away from the foot end of the intermediate frame 30 and outwardly beyond the end of the wheels 209*a*, 209*b* relative to the intermediate frame 30. Further, the foot end extension 70 is generally axially aligned with the flat configuration of the litter 22, as described above.

Figure 7A:
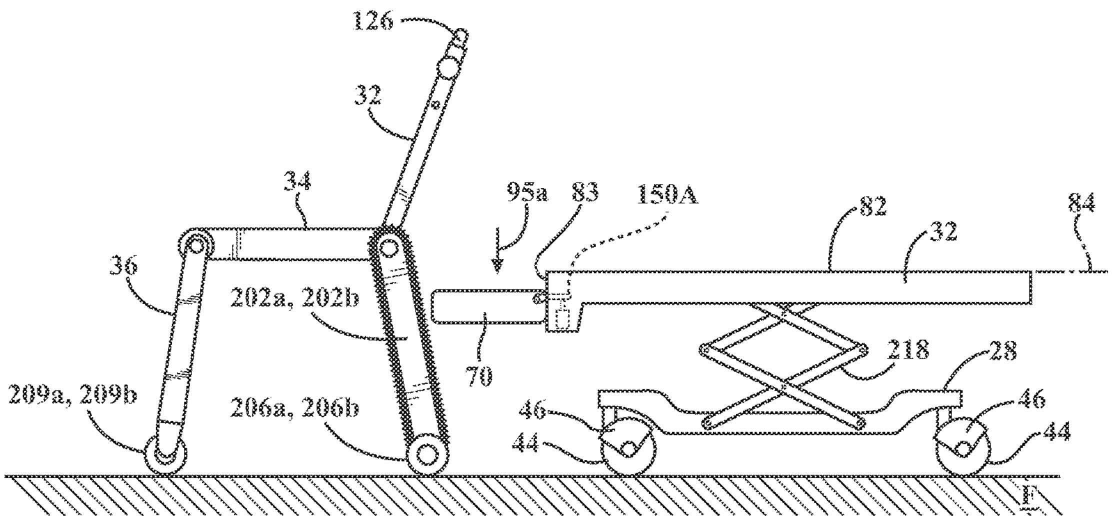
FIG. 7A is a side view of the base and litter in an undocked state, with the base comprising a foot end extension in accordance with still another alternative embodiment of the present disclosure.
Figure 7B:
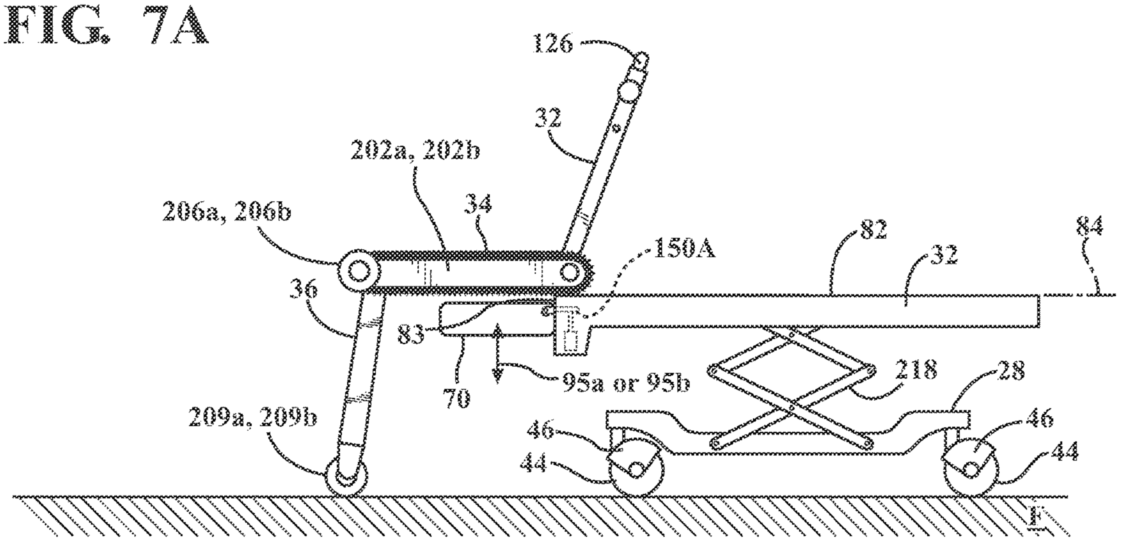
FIG. 7B is a side view of the base and litter of FIG. 7A in a partially docked state.

FIGS. 7A-7D, as noted above, describes yet another alternative configuration of the foot end extension 70 and its coupling to the intermediate frame 30 of the base 24. In the embodiment shown in FIGS. 7A-7D, as opposed to being fixedly mounted to the intermediate frame 30, the foot end extension 70 is instead coupled in a manner to the foot end 83 of the intermediate frame 30 such that it can be positioned in either the extended position (similar to what is shown in FIG. 4A above and illustrated in FIG. 7C) or in a lowered position (as shown in FIGS. 7A and 7B), and can be moved upward and downward relative to the intermediate frame 30 and floor surface F between the extended position and the lowered position by the user, with the movement represented by arrows 95*a* and 95*b*. In the lowered position, the foot end extension 70 extends generally horizontally with respect to the floor surface F, with the plane 78 defining the top surface 72 of the foot end extension 70 in the extended position parallel to the plane 78*b* defining the top surface 72 of the foot end extension 70 in the lowered position.

The method of coupling the foot end extension 70 to the intermediate frame 30 in FIGS. 7A-7D such that it may be moved between the extended position and the lowered position is not limited.

By way of example, the method of movement may be the sliding movement of the foot end extension 70 relative to the intermediate frame 30, in a manner generally described above with respect to FIGS. 6A-6E but wherein the movement of the foot end extension 70 in this embodiment is vertical relative to intermediate frame 30, and not generally horizontal as in the embodiments illustrated in FIGS. 6A-6E. Accordingly, and similar to the embodiment in FIGS. 6A-6E, the foot end 83 of the intermediate frame 30 may include a slot (with or without a channel), and a flange having a horizontally extending arm and rollers may be coupled to the inner end 74 of the foot end extension 70, with the vertically extending arms and rollers contained within the slot and optional channel (for ease of description and illustration, the entire alternative flange 150A is illustrated in phantom in FIGS. 7A-7D). Accordingly, the vertical rollers of the flange 150A roll within the slot as the foot end extension 70 is moved upward or downward between the extended position and the lowered position, as shown by arrows 95*a* or 95*b*. In another example, the reverse is true, wherein the inner end 74 of the foot end extension 70 includes the slot and optional channel and the intermediate frame 30 includes the flange having the horizontal support arm and rollers. Of course, other methods for slidingly coupling the foot end extension 70 to the intermediate frame 30 to facilitate the upward and downward movement are contemplated.

Preferably, when placed into the extended position, the foot end extension 70 is configured to be reversibly locked such that it remains stationary against any force applied to the top surface 72 in a direction towards the floor surface F, such as by the force of a patient's legs or feet disposed on the top surface 72. By way of example, a locking device such as a pin (not shown), described above with respect to the embodiment in FIGS. 4A-4D, may be utilized. Alternatively, when a linear actuator A is included, the linear actuator may provide the locking function alone or in conjunction with the temporary locking device. Of course, other devices for temporarily locking the foot end extension 70 in the extended position are contemplated.

Figure 7C:
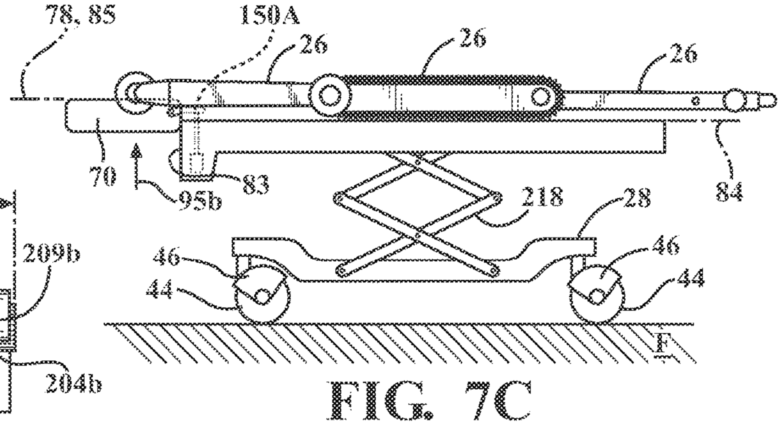
FIG. 7C is a side view of the base and litter of FIGS. 7A and 7B in a docked state.

Similar to certain of the embodiments in FIG. 6, a linear actuator A may also be incorporated into the intermediate frame 30, shown in FIGS. 7A-7C as being incorporated into an extension 30A of the intermediate frame 30) to aid in the movement upward and downward of the foot end extension 70 relative to the intermediate frame. The linear actuator A may be in conjunction with the temporary locking device, or may eliminate the need for such a temporary locking device.

Referring first to FIG. 7A, when the litter 22 and base 24 are in the undocked state, the litter 22 is positioned apart from the foot end 83 of the intermediate frame 30, and the foot end extension 70 can be in the extended position or in the lowered position.

When the litter 22 and base 24 are in the partially docked state, as shown in FIG. 7B, the foot end extension 70 has been placed in the lowered position. Further, and similar to FIG. 4B, the track frame members 202*a*, 202*b* of the track driving device 220 have been pivoted upward such that the length of the track frame members 202*a*, 202*b* and the wheels 209A, 209B are adjacent to the frame element 134 of the seat section 34. Also, at least a portion of the deck panel 124 of the seat section 34 is positioned above, or in contact with, the upper surface 82 of the intermediate frame 30 at the foot end 83. In certain embodiments, a portion of the deck panel 124 of the seat section 34 is also disposed adjacent to, but spaced from, the top surface 72 of the foot end extension 70. The remainder of the litter 22, aside from the pivoted track frame members 202*a*, 202*b* of the track driving device 220, remain in the upright or seated position, as described above.

Figure 7D:
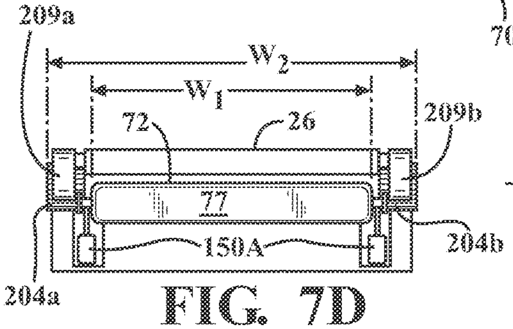
FIG. 7D is an end view of FIG. 7C.

When the litter 22 and base 24 are in the docked state, as shown in FIGS. 7C and 7D, the foot end extension 70 has been raised back to the extended position from the lowered position (the movement being represented by arrow 95*b* in FIG. 7C), and as such extends beyond the end of the substantially flat litter 22, and in particular beyond the end of the wheels 209*a*, 209*b* of the substantially flat litter 22. Moreover, the top surface 72 of the foot end extension 70 in the extended position, defined by the horizontal plane 78, is axially aligned with the axis 85 defined by the substantially flat litter 22. As such, the top surface 72 of the fixed foot end extension 70 provides an extended flat surface that is substantially axially aligned with the horizontal plane 86 defining the patient support surface 26 in the same manner as discussed above with respect to FIG. 4C. Preferably, and as noted above, the foot end extension 70 is temporarily locked in the extended position when in the extended position.

FIGS. 7A-7D can also be used to describe the method for moving the litter 22 relative to the base 24 from the undocked state through the partially docked state to the docked state.

The method begins wherein the litter 22 and base 24 are in the undocked state, and wherein a user ensures that the foot end extension 70 is positioned in the lowered position. This can be accomplished wherein the user lowers the foot end extension 70 relative to the intermediate frame 30 from the extended position to the lowered position as shown by arrow 95*a* (manually by the user or through the use of the linear actuator A, when present). Once the user ensures that the foot end extension 70 is in the lowered position, the litter 22 is moved towards the base 24 and proceeds generally to move the litter 22 relative to the base 24 to the partially docked state in the manner described above and not repeated herein. Once the litter 22 and the base 24 have been moved to the partially docked state, as shown in FIG. 7B, the method continues wherein the litter 22 continues to move towards the head end 80 of the intermediate frame 30 until such time that the litter 22 and the base 24 are fully coupled and in the docked state, as shown in FIG. 7C, and generally in accordance with the method described above and not repeated herein.

Once the litter 22 is in the docked state relative to the base 24, the foot end extension 70 is raised back to the extended position (shown by arrow 95*b*) by the user (manually or through the use of the linear actuator A, when present). In this extended position, as also shown in FIG. 7C, the foot end extension 70 extends outwardly away from the foot end of the intermediate frame 30 and outwardly beyond the end of the wheels 209*a*, 209*b* relative to the intermediate frame 30. While not shown, it is preferable that the foot end extension 70, after raising, is locked into the extended position such that the force of the patient's feet or legs does not cause the foot end extension to pivot downward towards the non-extended position. Alternative, as is shown, the inclusion of a linear actuator A can provide the locking feature for locking the foot end extension 70 in the extended position.

While the methods described above, with respect to the embodiments of FIGS. 4A-7D, describe the method for moving the litter 22 relative to the base 24 from the undocked state, through the partially docked state, and to the docked state, the same method can be applied to move the litter 22 relative to the base 24 from the docked state, through the partially docked state, and to the undocked state.

In addition, in further embodiments, and preferably prior to beginning the method of moving the litter 22 and the base 24 from the undocked state to the partially docked state in the methods described above with respect to each alternative foot end extension 70 of each of the exemplary embodiments of FIGS. 4A-7D, the base 24 has been lowered to its minimum height or to a height less than the maximum height by the actuation of the base lift device 240, wherein the first plane 78, defining the top surface 72 of the foot end extension 70, is located closer to the floor surface F than the lower surface of the deck panel 124 and/or frame element 134 of the seat section 34.

In certain embodiments, docking and undocking of the litter 22 relative to the base 24 may be accomplished as described in U.S. Patent Application Publication No. 2018/0369036 filed on Jun. 27, 2018, entitled "Patient Support Apparatus With Adaptive User Interface," which is hereby incorporated herein by reference.

In certain further embodiments, as also illustrated in FIG. 1, a control system 100 may be coupled to the patient support apparatus 20 that is configured to perform one or more predetermined functions on the patient support apparatus 20 that are related to the movement of the patient support apparatus 20 between the undocked position, the partially docked position, and the docked position and to associated functions related to such movement. In this regard, the control system 100 generally comprises one or more powered devices 102 operated by the controller 104. To this end, the powered devices 102 employ one or more components that utilize electricity in order to perform one or more predetermined functions.

In certain embodiments, one or more powered devices 102 of the patient support system and/or the patient support apparatus 20 may comprise powered adjustment devices, such as the track driving device 220, the base lift device 240, and the fowler section adjustment device 260. Other powered devices 102 are also contemplated. In addition, in certain embodiments, the controller 104 and an associated powered device 102 may be coupled to the foot end extension 70 and/or to the intermediate frame 30 to facilitate the movement of the foot end extension 70 relative to the intermediate frame 30 in the embodiments described in FIGS. 5A-7D. In this regard, one or more linear actuators A may be used to effectuate functions of each powered device 102 for moving the foot end extension 70 (see, e.g., the linear actuator shown in FIGS. 5A and 5C that is pivotally connected to brackets on the intermediate frame 30 and the foot end extension 70). By way of example, a servo motor or similar device may be used as the powered device 102 and coupled to the foot end extension 70 for facilitating the rotational and/or sliding movement of the foot end extension 70 between the extended and non-extended positions.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for supporting a patient, the patient support apparatus comprising:

a litter comprising a patient support surface to support the patient;

a base including an intermediate frame configured to removably receive the litter and further configured to interface with and support the litter when the litter is docked to the base in a docked state; and a foot end extension coupled to the intermediate frame, the foot end extension defining an extended position wherein at least a portion of the foot end extension extends outwardly from the intermediate frame and longitudinally beyond the litter when the litter is docked to the intermediate frame of the base in the docked state to receive and support one or both feet of the patient in the extended position, wherein the foot end extension is slidingly coupled to the intermediate frame and is moveable between a first slid position and a second slid position along an upper surface of the intermediate frame, the first slid position corresponding to the extended position when the litter is docked to the base.

2. The patient support apparatus of claim 1, wherein the litter is disposed above an upper surface of the intermediate frame when the litter is docked to the base in the docked state.

3. The patient support apparatus of claim 1, wherein the foot end extension is arranged substantially vertically with an adjacent portion of the patient support surface of the litter in the extended position.

4. The patient support apparatus of claim 1, wherein the foot end extension is fixedly coupled to the intermediate frame.

5. The patient support apparatus of claim 1, wherein the foot end extension is movably coupled to the intermediate frame and is moveable between a first position and a second position relative to the intermediate frame, wherein the first position corresponds to the extended position when the litter is docked to the base in the docked state.

6. The patient support apparatus of claim 5, wherein the intermediate frame includes an upper surface defining a first plane; and wherein a top surface of the foot end extension in the second position defines a second plane that is not coplanar with the first plane in the docked state.

7. The patient support apparatus of claim 6, wherein the second plane is spaced further from a floor surface than the first plane in the docked state.

8. The patient support apparatus of claim 1, wherein the foot end extension is hingedly coupled to the intermediate frame and pivotable relative to the intermediate frame between the extended position and a non-extended position.

9. The patient support apparatus of claim 8, wherein a top surface of the foot end extension extends transverse to an upper surface of the intermediate frame in the non-extended position.

10. The patient support apparatus of claim 8, wherein the foot end extension is configured to be reversibly locked to the intermediate frame in the extended position.

11. The patient support apparatus of claim 1, wherein the foot end extension is positioned inwardly towards the intermediate frame in the second slid position relative to the first slid position.

12. The patient support apparatus of claim 1, wherein the foot end extension is movable between a first horizontal position and a second horizontal position, the first horizontal position corresponding to the extended position when the litter is docked to the base.

13. The patient support apparatus of claim 12, wherein the base includes a base frame supporting the intermediate frame; and wherein a top surface of the foot end extension is closer to the base frame in the first horizontal position than in the second horizontal position.

14. A method for docking a litter to a base in a patient support apparatus, the method comprising:

providing the litter and the base in an undocked state, with the litter comprising a patient support surface and the base comprising an intermediate frame;

coupling a foot end extension to the intermediate frame, the foot end extension being moveable between a first position and a second position relative to the intermediate frame;

moving the foot end extension from a first position to a second position relative to the intermediate frame;

mounting the litter to the base in a docked state such that the patient support surface is in a substantially flat configuration relative to and above the intermediate frame; and moving the foot end extension from the second position to the first position after the mounting step, the first position defining an extended position of the foot end extension wherein at least a portion of the foot end extension extends outwardly from and longitudinally beyond the litter, and wherein a top surface of the foot end extension is vertically aligned with and adjacent portion of the patient support surface in the extended position.

15. The method of claim 14, wherein the step of coupling a foot end extension comprises hingedly coupling a foot end extension to the intermediate frame, and wherein the step of moving the foot end extension includes pivoting the foot end extension relative to the intermediate frame from the second position to the first position after the mounting step.

16. The method of claim 15, wherein the top surface of the foot end extension is not axially aligned with an adjacent portion of the patient support surface of the litter in the second position after the mounting step and prior to the moving step.

17. The method of claim 15, wherein the top surface of the foot end extension extends transverse to an upper surface of the intermediate frame in the second position prior to the mounting step and prior to the moving step.

18. The method of claim 14, wherein the step of coupling a foot end extension comprises slidingly coupling a foot end extension to the intermediate frame, and wherein the step of moving the foot end extension includes sliding the foot end extension relative to the intermediate frame from the second position to the first position after the mounting step.

19. A patient support apparatus for supporting a patient, the patient support apparatus comprising:

a litter comprising a patient support surface to support the patient;

a base including an intermediate frame configured to removably receive the litter and further configured to interface with and support the litter when the litter is docked to the base in a docked state; and a foot end extension coupled to the intermediate frame, the foot end extension defining an extended position wherein at least a portion of the foot end extension extends outwardly from the intermediate frame and longitudinally beyond the litter when the litter is docked to the intermediate frame of the base in the docked state to receive and support one or both feet of the patient in the extended position, wherein the foot end extension is arranged substantially vertically with an adjacent portion of the patient support surface of the litter in the extended position.

* * * * *